May 25, 1937. E. G. A. NYLUND Re. 20,382
KEY OPERATED STRINGED MUSICAL INSTRUMENT
Original Filed June 7, 1934
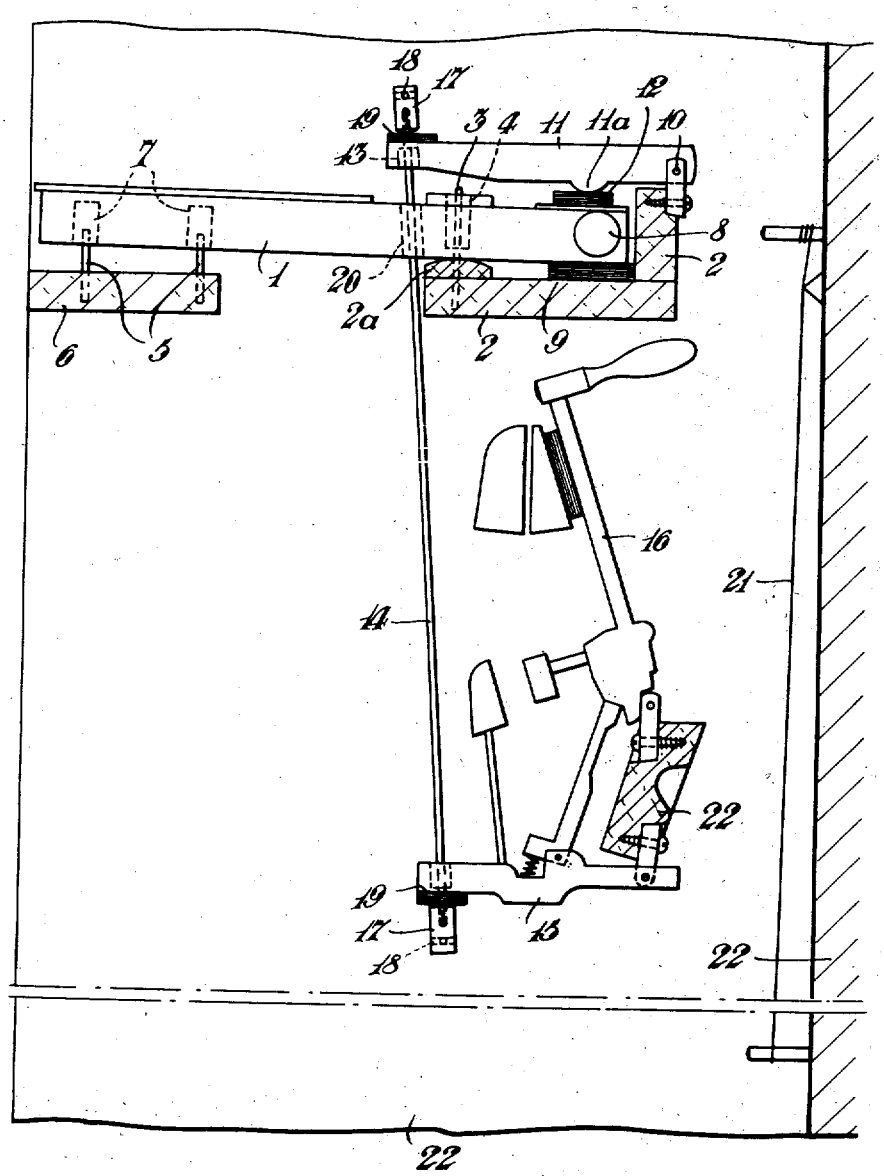
Inventor
Emil G. A. Nylund
by Williams, Rich & Morse
Attorneys Reissued May 25, 1937 Re. 20,382

UNITED STATES PATENT OFFICE 20,382

KEY OPERATED STRINGED MUSICAL INSTRUMENT

Emil Gustav Alfred Nylund, Uppsala, Sweden, assignor to W. G. Eavestaff & Sons Limited, London, England Original No. 1,999,914, dated April 30, 1935, Serial No. 729,494, June 7, 1934. Application for reissue February 3, 1937, Serial No. 123,858. In Sweden June 15, 1933.

5 Claims. (Cl. 84—240)

This invention refers to key-operated stringed musical instruments, such as pianos. The chief object of this invention is to render it possible to concentrate the key-operated mechanism and make it more compact.

Another object of this invention is to render it possible to use so called balanced keys, i. e. keys in the shape of levers "of the first kind" (having the fulcrum between the power and the load), in pianos of small sizes, such as miniature pianos. By use of this invention it is possible to shorten the back part of the lever (behind the fulcrum) and still attain a satisfactory operation of the mechanism and a good touch and a standard touch depth.

As a non-limitative example it may be mentioned that by use of this invention it is possible to build very small pianos, for instance, having a length of 121 cm., a height of 85 cm. and a width or depth of 40 cm., but still as good as normal pianos.

Another object of this invention is to construct such small pianos with a very rapid repetition, though the length of the keys is reduced, while simultaneously the striking of the hammers will be as good as in normal pianos.

Though the mechanism in acordance with this invention is very compact, it is nevertheless absolutely reliable.

Other objects of this invention will be evident from the following specification and claims.

One embodiment of a mechanism or action in accordance with this invention is illustrated in the annexed drawing showing a cross-section between two keys of a piano mechanism.

Referring now to the drawing, 1 indicates a key pivoted on a support 2*a* on a stationary frame or base 2 by means of a pin 3 entering an oblong or oval slot 4 in the key. Thus, the key is of the balanced type, i. e. has its fulcrum 3 at an inner point between the ends. The key is guided in the usual manner by means of other pins 5 fixed in a stationary base 6 and entering oblong recesses 7 in the lower side of the key. A leaden weight 8 may be secured to (moulded into a hole in) the back end of the key, for the purpose of adjusting the balance of the key, which normally rests upon a lower cushion 9 on the base 2. On said stationary base a pivot 10 is secured forming a fulcrum for a single-armed (non-balanced) lever 11, which is a lever "of the third kind," which by means of a rounded projection 11*a* rests on a felt pad 12 on the upper side of the back or inner end of the key 1. Through a recess 13 in the opposite, free end of the lever 11 a pull rod or wire 14 is inserted conecting said lever 11 with the operating lever 15 for the hammer 16.

The pull rod 14 is at both ends provided with nuts 17 screwed thereon. Said nuts have cross-holes 18 through which a thin pin or the like may be introduced for turning the round nuts 17 for adjustment. Between the nuts 17 and the levers 11, 15 felt pads 19 are inserted. The pull rod 14 passes through an oblong hole or slot 20 in the key 1 between its pivot 2*a* and its front or finger end (touch end).

The standing or upright hammer 16, its operating lever or wippen 15 and the adjacent parts of the "action" are of the conventional construction used in pianos and form no part of this invention. For this reason they need not be described in detail. The hammer strikes the corresponding string or strings 21.

The stationary frame of the piano is indicated as a whole by 22. The parts 2 and 6 are rigidly secured to said frame.

The front or touch part of the key 1 from its free end to the fulcrum 2*a* is of standard length and has the standard depth of touch. The back part of the key 1 between the fulcrum 2*a* and the point 11*a* is on the contrary shortened.

This device acts as follows:

In striking or depressing the key 1, the motion is transferred to the lever 11 actuating the operating lever or wippen 15 via the pull rod 14 so that the hammer or club 16 strikes the string 21. In spite of the fact that the back part of the key has been shortened, a sufficient motion is attained inasmuch as the lever 11 will magnify or amplify the motion of the key and gives the pull rod or wire 14 the same motion as in a normal piano having keys of the standard length. Thus, the touch is just as good as in big pianos and a very rapid repetition is attained. When the key is let loose or released, gravity will return the parts to their normal positions shown in the drawing.

It is very easy to adjust the mechanism shown because all back lash or play may be eliminated by adjusting the effective length of the rod 14 by means of either or both of the nuts 17 which may easily be exactly adjusted.

What I claim is:

1. A miniature piano comprising, in combination, a key consisting of a lever of the first kind of substantially standard length in front of the fulcrum but shortened behind the fulcrum, a stationary pivot, a lever of the third kind fulcrumed on said pivot, means for transmitting the power from the rear end of the key to an intermediate point of said lever, a piano action below said key, and means for transmitting the motion of said lever to said action to operate the same.

2. A miniature piano comprising, in combination, a key consisting of a lever of the first kind of substantially standard length in front of the fulcrum but shortened behind the fulcrum, a stationary pivot, a lever of the third kind fulcrumed on said pivot and extending toward the front of said key, means for transmitting the power from the rear end of the key to an intermediate point of said lever, a piano action below said key, and means for transmitting the motion of said lever to said action to operate the same.

3. A miniature piano comprising, in combination, a key consisting of a lever of the first kind of substantially standard length in front of the fulcrum but shortened behind the fulcrum, a stationary pivot, a lever of the third kind fulcrumed on said pivot and extending forwardly above the rear of said key, said lever and said key being so arranged that said key lifts said lever at an intermediate point, a piano action below said key, and means for transmitting the motion of said lever to said action to operate the same.

4. A miniature piano comprising, in combination, a key consisting of a lever of the first kind of substantially standard length in front of the fulcrum but shortened behind the fulcrum, a stationary pivot, a lever of the third kind fulcrumed on said pivot, means for transmitting the power from the rear end of the key to an intermediate point of said lever, a piano action below said key including a wippen, and a pull member connecting said lever with said wippen.

5. A miniature piano comprising, in combination, a key consisting of a lever of the first kind of substantially standard length in front of the fulcrum but shortened behind the fulcrum, a stationary pivot, a lever of the third kind fulcrumed on said pivot and extending forwardly above the rear of said key, means for transmitting the power from the rear end of the key to an intermediate point of said lever, a piano action below said key, and a pull member connecting said lever with said action and passing through an aperture in said key.

EMIL GUSTAV ALFRED NYLUND.